United States Patent
Benco et al.

(10) Patent No.: US 7,965,998 B2
(45) Date of Patent: Jun. 21, 2011

(54) NETWORK SUPPORT FOR HANDSET DATA PROTECTION

(75) Inventors: David S. Benco, Winfield, IL (US);
Sanjeev Mahajan, Naperville, IL (US);
Baoling S. Sheen, Naperville, IL (US);
Sandra L. True, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 911 days.

(21) Appl. No.: 11/408,304

(22) Filed: Apr. 21, 2006

(65) Prior Publication Data

US 2007/0249322 A1    Oct. 25, 2007

(51) Int. Cl.
*H04M 3/16* (2006.01)
(52) U.S. Cl. ......................................................... 455/410
(58) Field of Classification Search .................. 455/410, 455/558, 414.1, 557, 56.1, 33.1, 23, 62, 54.1, 455/551, 552, 422, 186.1, 227
See application file for complete search history.

(56) References Cited

U.S. PATENT DOCUMENTS

| | | | |
|---|---|---|---|
| 6,427,073 B1 * | 7/2002 | Kortesalmi et al. | 455/414.1 |
| 2006/0156052 A1 * | 7/2006 | Bodnar et al. | 714/2 |
| 2007/0021112 A1 * | 1/2007 | Byrne et al. | 455/419 |
| 2007/0178881 A1 * | 8/2007 | Teunissen et al. | 455/410 |
| 2008/0189364 A1 * | 8/2008 | Landon et al. | 709/204 |
| 2009/0075593 A1 * | 3/2009 | Demirbasa et al. | 455/41.2 |

* cited by examiner

*Primary Examiner* — Melody Mehrpour
(74) *Attorney, Agent, or Firm* — Carmen Patti Law Group, LLC

(57) ABSTRACT

An apparatus in one example has: a telecommunication network operatively coupled to at least one mobile terminal; a handset data transfer module in the at least one mobile terminal; a mobile handset protection application server in the telecommunication network; and an emergency storage location operatively coupled to the mobile handset protection application server; wherein, if the mobile terminal is identified as being lost/stolen, the mobile handset protection application server communicates with the handset data transfer module to upload the handset data to the emergency storage location in the telecommunication network.

25 Claims, 5 Drawing Sheets

---

DETERMINING THAT A MOBILE TERMINAL IS A LOST/STOLEN MOBILE TERMINAL HAVING HANDSET DATA
201

COPYING THE HANDSET DATA TO AN EMERGENCY STORAGE LOCATION IN THE NETWORK
202

DELETING THE HANDSET DATA FROM THE LOST/STOLEN MOBILE TERMINAL
203

NETWORK SUPPORT FOR HANDSET DATA PROTECTION

TECHNICAL FIELD

The invention relates generally to telecommunication systems and, more specifically, to a system that provides improved mobile terminal data protection/privacy in situations where a mobile terminal is lost or stolen.

BACKGROUND

Wireless communication systems are constantly evolving. System designers are continually developing greater numbers of features for both service providers as well as for the end users. In the area of wireless phone systems, cellular based phone systems have advanced tremendously in recent years. Wireless phone systems are available based on a variety of modulation techniques and are capable of using a number of allocated frequency bands. Available modulation schemes include analog FM and digital modulation schemes using Time Division Multiple Access (TDMA) or Code Division Multiple Access (CDMA). Each scheme has inherent advantages and disadvantages relating to system architecture, frequency reuse, and communications quality. However, the features the manufacturer offers to the service provider and which the service provider offers to the consumer are similar between the different wireless systems.

Mobile terminals, also referred to as cell phones, handsets, etc. are very much in demand and because of their small size they are easily lost or stolen. The existing protection when a mobile terminal is lost/stolen can only prevent the mobile terminal from originating or terminating calls, but cannot prevent the data stored in the mobile terminal being removed or being used by other people. Furthermore, this originating/terminating call protection requires manually setting and entering passwords, and mobile subscribers normally do not endure the inconvenience necessary to protect their mobile terminals at this minimal level.

Thus, there is a need in the art for a system which provides improved mobile terminal data protection/privacy in situations where a mobile terminal is lost or stolen.

SUMMARY

One embodiment of the present method and apparatus encompasses an apparatus. This embodiment may comprise: a telecommunication network operatively coupled to at least one mobile terminal; a handset data transfer module in the at least one mobile terminal; a mobile handset protection application server in the telecommunication network; and an emergency storage location operatively coupled to the mobile handset protection application server; wherein, if the mobile terminal is identified as being lost/stolen, the mobile handset protection application server communicates with the handset data transfer module to upload the handset data to the emergency storage location in the telecommunication network.

Another embodiment of the present method and apparatus encompasses a method. This embodiment may comprise: determining that a mobile terminal is a lost/stolen mobile terminal having handset data; copying the handset data to an emergency storage location in the network; and deleting the handset data from the lost/stolen mobile terminal.

DESCRIPTION OF THE DRAWINGS

Features of exemplary implementations of the invention will become apparent from the description, the claims, and the accompanying drawings in which:

DETAILED DESCRIPTION

Figure 1:
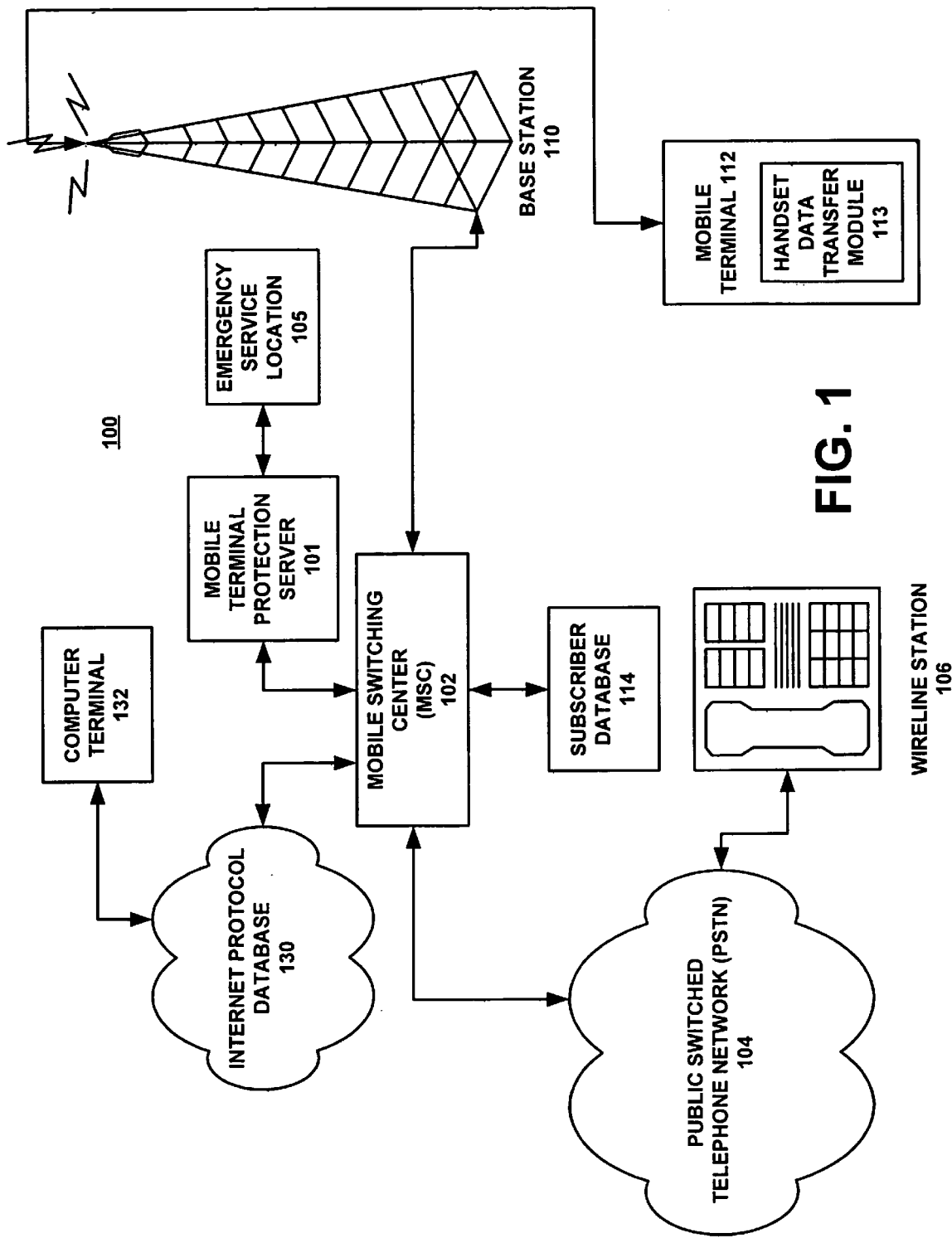
FIG. 1 is a representation of one embodiment that uses a mobile telecommunications network for providing a level of handset data protection/privacy in situations where a mobile terminal is lost or stolen.

Because mobile terminals, also referred to as mobile handset devices, cell phones, etc., have become so popular and relied upon for storing not only important contact information, but pictures, email, video clips, memos, etc., it is important that mobile subscribers have a feeling of security and protection in the event that a mobile terminal becomes lost or stolen.

With the embodiments of the present method and apparatus a subscriber is able to initiate an instruction to the telecommunications network, such as from another mobile terminal, a landline phone, or from a website, to first copy all handset data to an emergency storage location in the network, to next delete all the handset data in the mobile terminal, and to then change the welcome screen to display a message indicating that this particular mobile terminal has been lost/stolen. The welcome message may also include a name and telephone number of the owner of the mobile terminal.

Embodiments of the present method and apparatus give a subscriber peace of mind knowing that if their mobile terminal should be lost or stolen, all their important data will not be lost for good (as it will be retrievable from the network), and that it will not be available for someone else to view, copy, publish, or pass on to other people.

In general, embodiments of the present method and apparatus operate and are structured as follows. A mobile subscriber buys a handset data protection feature that may be billed as a one-time charge or a per-month fee. When the feature is activated by the network, the mobile subscriber sets up provisional parameters. For example, the subscriber may provision the following types of data: a password to be entered in order to activate feature, and a new welcome message to be displayed on a lost/stolen mobile terminal.

In the event that a subscriber's handset device is discovered as being lost or stolen, the mobile subscriber may call this handset data protection feature into use. This may be accomplished in numerous ways, such as through a call to a customer service representative from another mobile terminal or a landline phone, through a website interface, or through a call to an automated service. The mobile subscriber may identify the mobile number and there may be a built-in password protection such that another person couldn't maliciously delete another person's handset data.

For a lost/stolen mobile terminal, the telecommunication network will find the mobile terminal when the mobile terminal is powered up. The telecommunication network may then issue a command to upload the handset data of the mobile terminal to an emergency storage location in the network. Provided the handset data has been successfully copied to the emergency storage location in the network, the telecommunications network may then issue a command to the mobile terminal to cause all the handset data to be erased from the mobile terminal, including contact lists, storage emails, stored text messages, pictures, video clips, memos, etc.

The telecommunications network may then download the previously customer-provisioned welcome message to the mobile terminal that may identify the mobile terminal as stolen/lost, and give the name/number where the owner could be reached. For example:

THIS MOBILE HAS BEEN
REPORTED LOST/STOLEN!
PLEASE RETURN TO JOHN SMITH
BY CALLING 312-932-7632.

Also, the telecommunication network may mark this mobile terminal as lost/stolen such that it could not be re-activated to another number until the lost/stolen marking in the network is removed by the mobile subscriber.

Referring to FIG. 1, a telecommunication network 100 is depicted for at least one mobile terminal 112 of a plurality of mobile terminals that is operatively coupled to the telecommunication network. Mobile terminal 112 may be implemented as a cellular device, personal communication device, short message service device, wireless communications device (e.g., a wireless personal digital assistant), etc.

The telecommunication network 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 is operatively coupled to the MSC 102. The PSTN 104 routes calls to and from mobile users through the MSC 102. The PSTN 104 also routes calls from and to wireline stations 106. The PSTN 104 generally can be implemented as the worldwide voice telephone network accessible to all those with telephones and access privileges (e.g., AT&T long distance network).

The MSC 102 may also be operatively coupled to one or more base stations (BS) 110. Each of the base stations 110 communicates with mobile terminal(s) 112 in its service area.

Each of the mobile terminals 112 may have a information is a subscriber database 114 where data about each of the mobile terminals 112 resides. The subscriber database 114 may be operatively coupled to the MSC 102.

The subscriber database 114 may be utilized generally to identify/verify a subscriber, and also contains subscriber data related to features and services. The subscriber database 114 is generally utilized not only when a call is being made within a coverage area supported by a cellular provider of record, but also to verify the legitimacy and to support subscriber features.

The MSC 102 may further be coupled to a computer terminal 132 via an Internet protocol database 130.

The MSC 102 may additionally be coupled to a mobile terminal protection server 101. The mobile terminal protection server 101 may be operatively coupled to an emergency service location 105, such as a separate database or a database that is part of the subscriber database 114.

Figure 2:
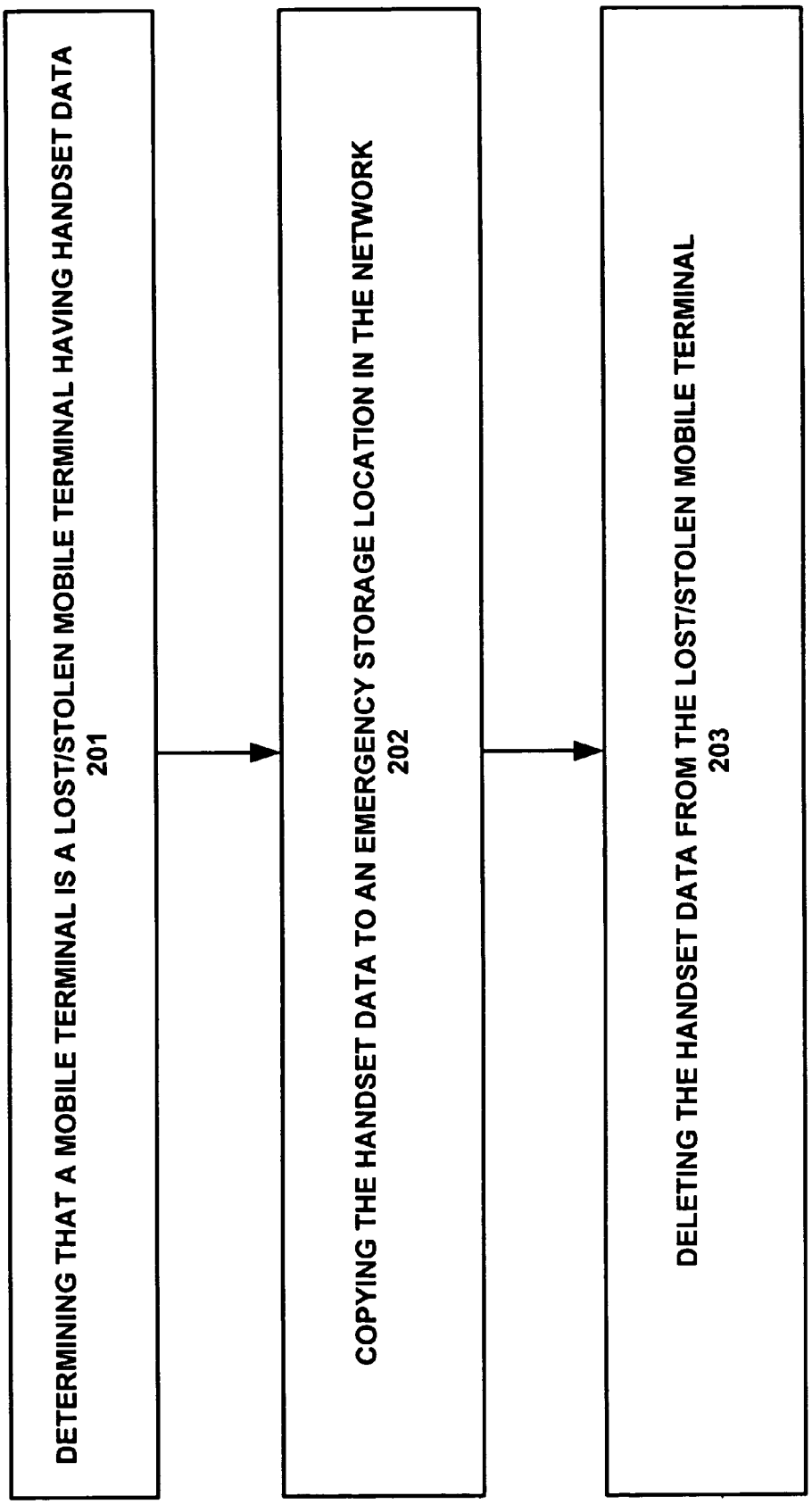
FIG. 2 is a flow diagram of one embodiment according to the present method for providing a level of handset data protection/privacy in situations where a mobile terminal is lost or stolen.

FIG. 2 is a flow diagram of one embodiment according to the present method for providing a level of handset data protection/privacy in situations where a mobile terminal is lost or stolen. This embodiment may have the steps of: determining that a mobile terminal is a lost/stolen mobile terminal having handset data (201); copying the handset data to an emergency storage location in the network (202); and deleting the handset data from the lost/stolen mobile terminal (203).

Figure 3:
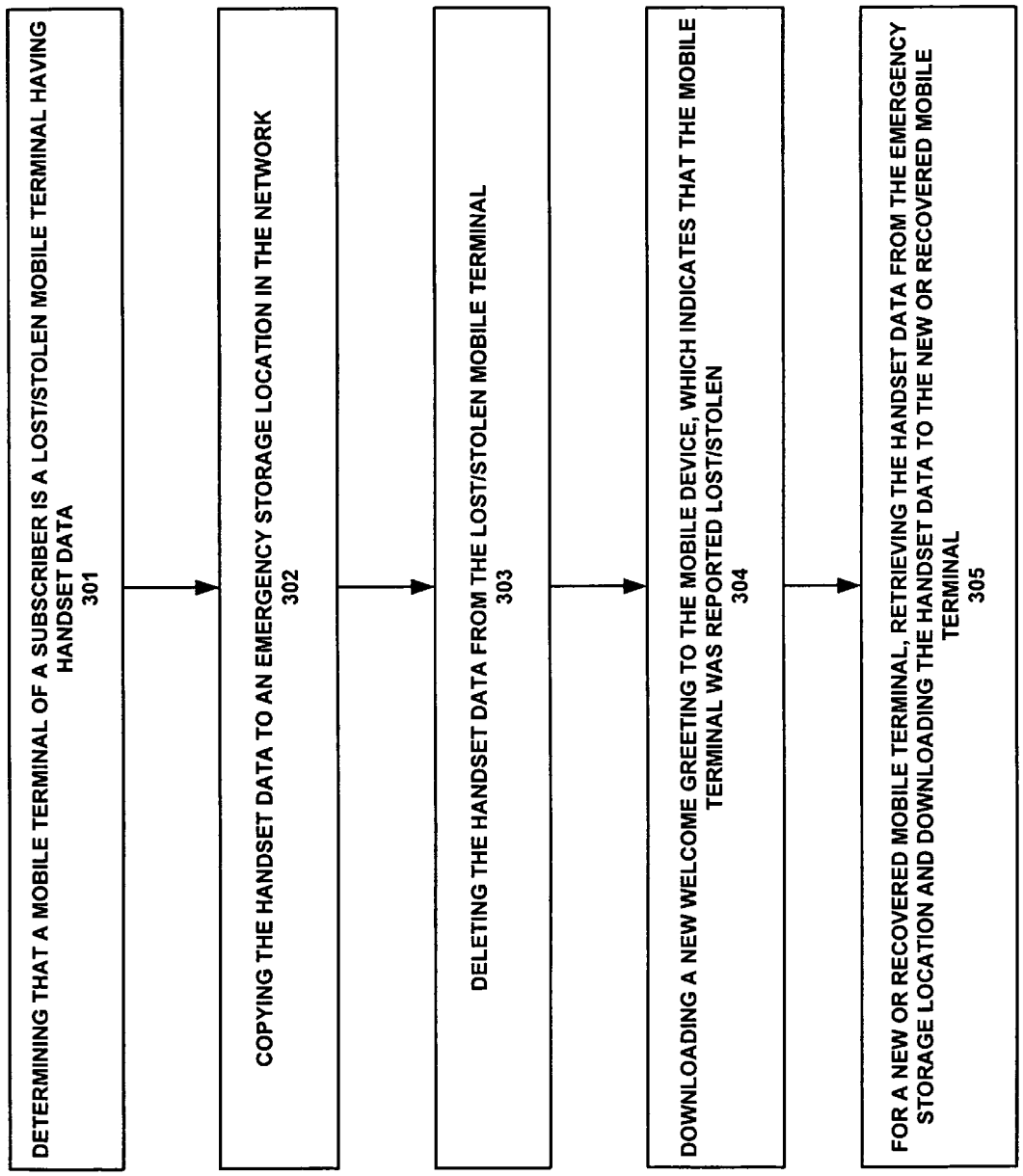
FIG. 3 is a flow diagram of another embodiment according to the present method for providing a level of handset data protection/privacy in situations where a mobile terminal is lost or stolen.

FIG. 3 is another flow diagram of one embodiment according to the present method for providing a level of handset data protection/privacy in situations where a mobile terminal is lost or stolen. This embodiment may have the steps of: determining that a mobile terminal is a lost/stolen mobile terminal having handset data (301); copying the handset data to an emergency storage location in the network (302); deleting the handset data from the lost/stolen mobile terminal (303); downloading a new welcome greeting to the mobile device, which indicates that the mobile terminal was reported lost/stolen (304); for a new or recovered mobile terminal the handset data is retrieve from the emergency storage location and downloaded to the new or recovered mobile terminal (305).

The determining that a mobile terminal is a lost/stolen mobile terminal may be accomplished through at least one of a call to a customer service representative from another mobile terminal or landline, a web interface, and a call to an automated service.

The new welcome greeting may also indicate a name/number that conveys information regarding how to contact the owner of the lost/stolen mobile terminal. This is particularly useful when an honest person finds the mobile terminal and wants to return it to the owner. A particular ESN/MEID of a mobile terminal may be marked as being stolen/lost such that the mobile terminal cannot be activated with a new number.

When the mobile terminal, which was lost/stolen, is recovered, the handset data is retrieve from the emergency storage location and downloaded to the recovered mobile terminal. The retrieval of the handset data may be password protected. The handset data may consist of at least one of contact lists, storage emails, stored text messages, pictures, video clips, and memos.

Figure 4:
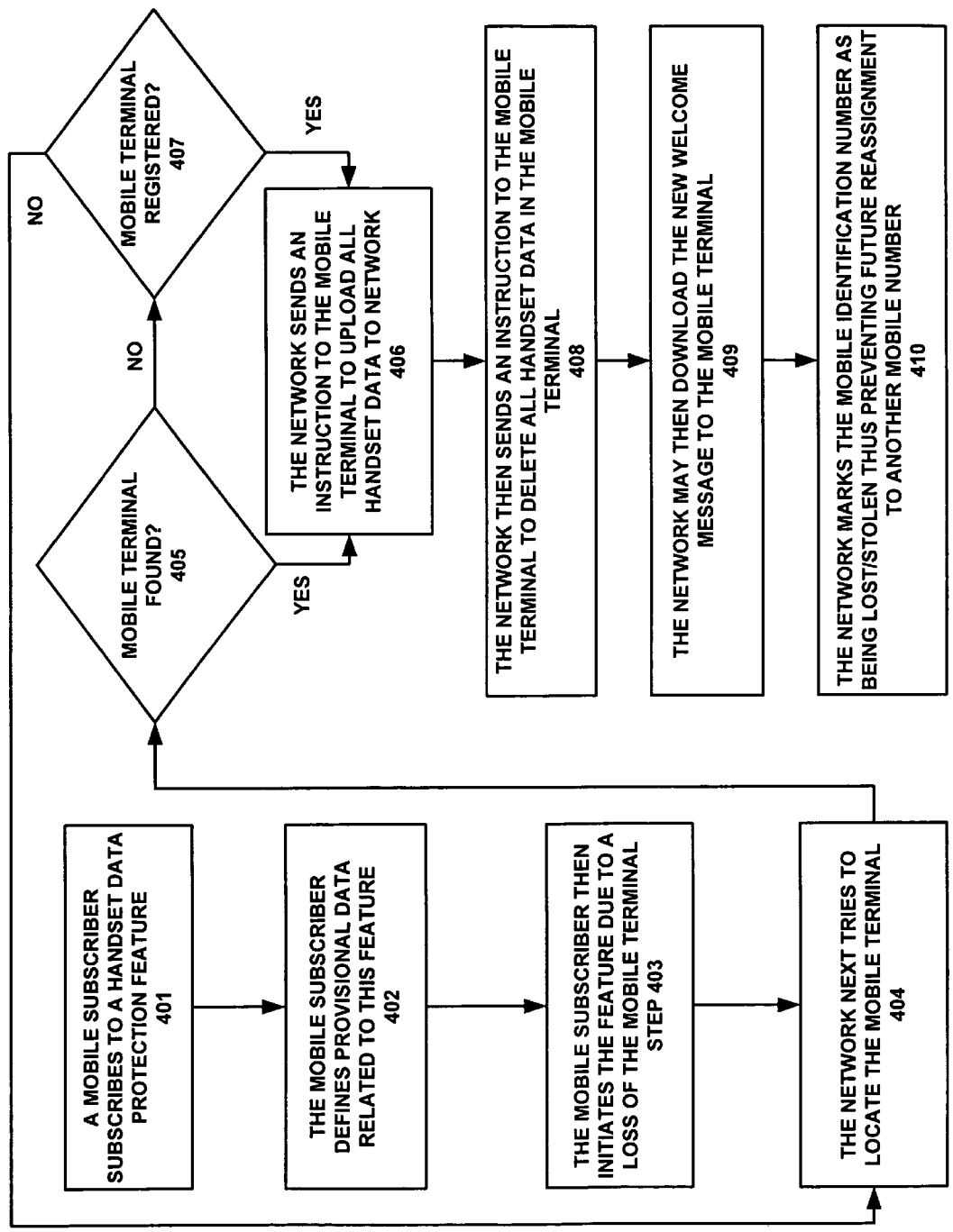
FIG. 4 depicts another embodiment of the present method.

FIG. 4 depicts another embodiment of the present method. In this embodiment a mobile subscriber subscribes to a handset data protection feature (step 401). The mobile subscriber defines provisional data related to this feature (step 402). The mobile subscriber then initiates the feature due to a loss of the mobile terminal (step 403).

The network next tries to locate the mobile terminal (step 404). If the mobile terminal is found (step 405), the network sends an instruction to the mobile terminal to upload all handset data to network (step 406). If the mobile terminal is not found, the network checks if the mobile terminal is registered (step 407). If the mobile terminal is not registered then there is a return to step 404. If the mobile terminal is registered, then go to step 406. The network then sends an instruction to the mobile terminal to delete all handset data in the mobile terminal (step 408). The network may then download the new welcome message to the mobile terminal (step 409). Finally, the network marks the mobile identification number as being lost/stolen thus preventing future reassignment to another mobile number (step 410).

Figure 5:
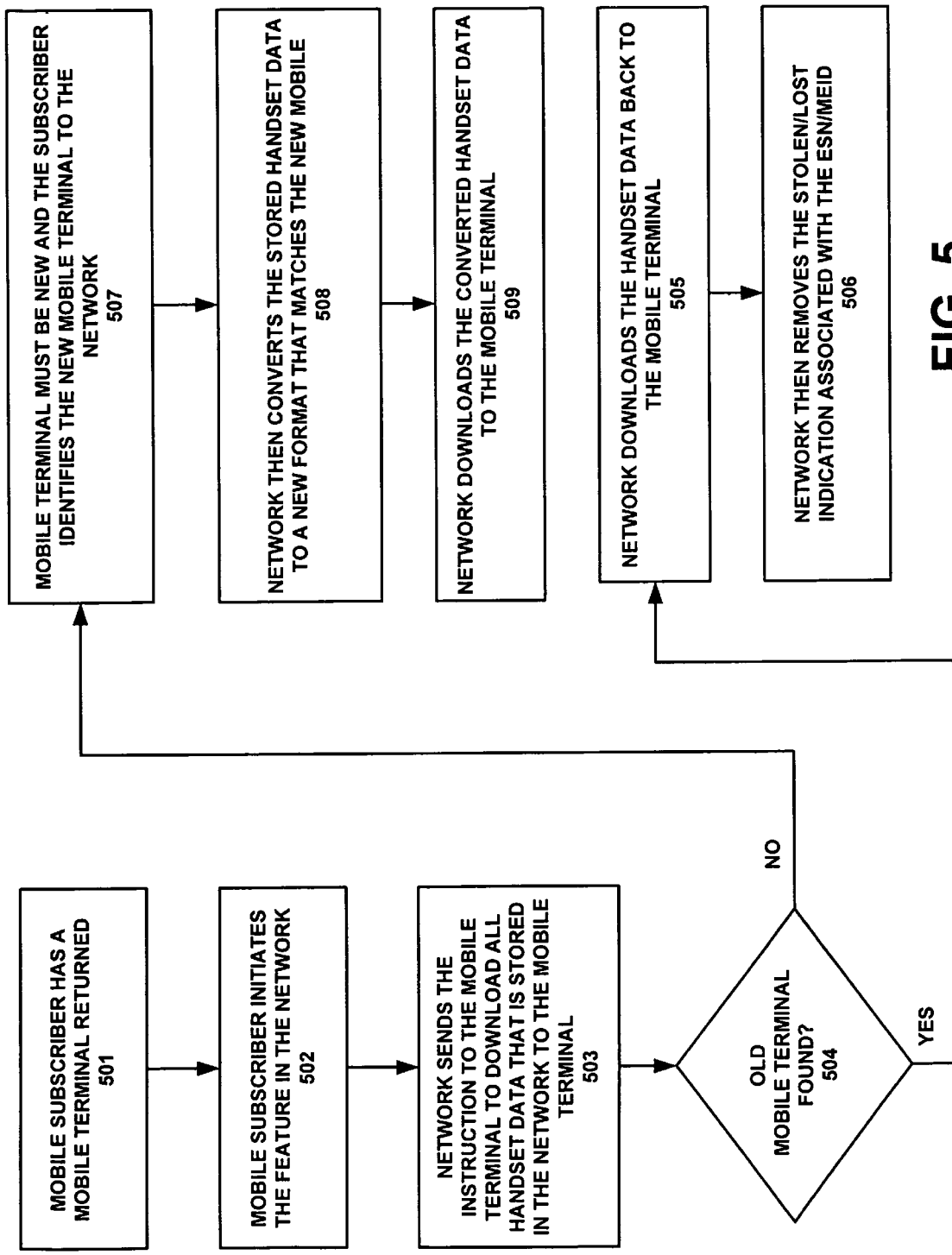
FIG. 5 depicts a further embodiment of the present method.

FIG. 5 depicts a further embodiment of the present method. In this embodiment a mobile subscriber has a mobile terminal returned (this procedure also applies to purchasing a new mobile terminal to replace the stolen/lost mobile terminal) (step 501). The mobile subscriber initiates the feature in the network (step 502). The network sends the instruction to the mobile terminal to download all handset data that is stored in the network to the mobile terminal (step 503).

The network then determines if the mobile terminal, which was stolen/lost, has been found (step 504). If it is the stolen/lost mobile terminal, the network downloads the handset data back to the mobile terminal (step 505). The network then removes the stolen/lost indication associated with the ESN/MEID (step 506). If in step 504 the network determines that the mobile terminal, which was stolen/lost, has not been found, then the mobile terminal must be new and the subscriber identifies the new mobile terminal to the network (step 507). The network then converts the stored handset data to a new format that matches the new mobile (step 508). Finally, the network downloads the converted handset data to the mobile terminal (509).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. The computer-readable signal-bearing medium in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. A method, comprising:
    determining that a mobile terminal is a lost/stolen mobile terminal having handset data;
    copying the handset data to a temporary emergency storage location in the network to form a handset data copy if the mobile terminal is determined to be the lost/stolen mobile terminal; and
    automatically deleting the handset data from the lost/stolen mobile terminal by the network without altering the content of the handset data copy in the temporary emergency storage location.

2. The method according to claim 1, wherein the method further comprises downloading a custom welcome greeting to the mobile terminal, which indicates to a person who may find the mobile terminal that the mobile terminal was reported lost/stolen and selectively providing additional contact information for the mobile terminal owner.

3. The method according to claim 2, wherein the custom welcome greeting also indicates a name/number where an owner of the lost/stolen mobile terminal is reach able.

4. The method according to claim 1, wherein for a new mobile terminal the handset data is retrieve from the temporary emergency storage location and downloaded to the new mobile terminal.

5. The method according to claim 4, wherein the retrieval of the handset data is password protected.

6. The method according to claim 1, wherein when the mobile terminal, which was lost/stolen, is recovered, the handset data is retrieved from the temporary emergency storage location and downloaded to the recovered mobile terminal.

7. The method according to claim 6, wherein the retrieval of the handset data is password protected.

8. The method according to claim 1, wherein a particular ESN/MEID of a mobile terminal is marked as being stolen/lost such that the mobile terminal cannot be activated with a new number.

9. The method according to claim 1, wherein the determining that a mobile terminal is a lost/stolen mobile terminal is accomplished through at least one of a call to a customer service representative from another mobile terminal or landline, a web interface, and a call to an automated service.

10. The method according to claim 1, wherein the handset data comprises at least one of contact lists, storage emails, stored text messages, pictures, video clips, and memos.

11. A method, comprising:
    determining that a mobile terminal is a lost/stolen mobile terminal having handset data;
    copying the handset data to a temporary emergency storage location in the network to form a handset data copy;
    automatically deleting the handset data from the lost/stolen mobile terminal via the network without altering the content of the handset data copy; and
    downloading a custom welcome greeting to the mobile device, which indicates to a person who may find the mobile terminal that the mobile terminal was reported lost/stolen.

12. The method according to claim 11, wherein the custom welcome greeting also indicates a name/number where an owner of the lost/stolen mobile terminal is reachable.

13. The method according to claim 11, wherein for a new mobile terminal the handset data is retrieved from the temporary emergency storage location and downloaded to the new mobile terminal.

14. The method according to claim 13, wherein the retrieval of the handset data is password protected.

15. The method according to claim 11, wherein when the mobile terminal, which was lost/stolen, is recovered, the handset data is retrieved from the temporary emergency storage location and downloaded to the recovered mobile terminal.

16. The method according to claim 15, wherein the retrieval of the handset data is password protected.

17. The method according to claim 11, wherein a particular ESN/MEID of a mobile terminal is marked as being stolen/lost such that the mobile terminal cannot be activated with a new number.

18. The method according to claim 11, wherein the determining that a mobile terminal is a lost/stolen mobile terminal is accomplished through at least one of a call to a customer service representative from another mobile terminal or landline, a web interface, and a call to an automated service.

19. The method according to claim 11, wherein the handset data comprises at least one of contact lists, storage emails, stored text messages, pictures, video clips, and memos.

20. An apparatus, comprising:
    a telecommunication network operatively coupled to at least one mobile terminal;
    a handset data transfer module in the at least one mobile terminal;
    a mobile handset protection application server in the telecommunication network; and a temporary emergency storage location operatively coupled to the mobile handset protection application server;

wherein, if the mobile terminal is identified as being lost/stolen, the mobile handset protection application server communicates with the handset data transfer module to upload the handset data to the temporary emergency storage location in the telecommunication network to form a handset data copy and automatically deletes the handset data without altering the handset data copy.

21. The apparatus according to claim 20, wherein the apparatus further comprises a new welcome greeting that is downloaded to the mobile device, which indicates to a person who may find the mobile terminal that the mobile terminal was reported lost/stolen.

22. The apparatus according to claim 21, wherein the new welcome greeting also indicates a name/number where an owner of the lost/stolen mobile terminal is reachable.

23. The apparatus according to claim 20, wherein for a new or recovered mobile terminal the mobile handset protection application server communicates with the handset data transfer module to retrieve the handset data from the temporary emergency storage location and download the handset data to the new mobile terminal.

24. The apparatus according to claim 20, wherein the determination that a mobile terminal is a lost/stolen mobile terminal is accomplished through at least one of a call to a customer service representative from another mobile terminal or landline, a web interface, and a call to an automated service.

25. The method according to claim 20, wherein the handset data comprises at least one of contact lists, storage emails, stored text messages, pictures, video clips, and memos.

* * * * *